Figure 2:
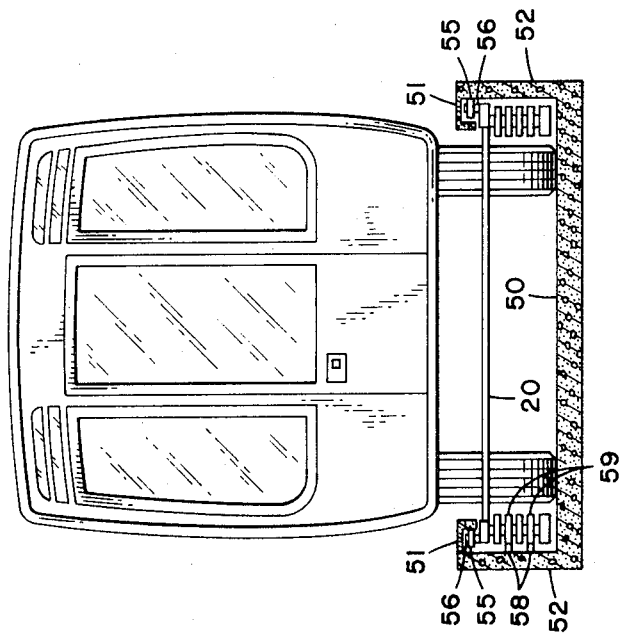

United States Patent [19]
Goode

[11] 3,796,165
[45] Mar. 12, 1974

[54] GUIDE FOLLOWING STEERING APPARATUS

[75] Inventor: William P. Goode, Dallas, Tex.
[73] Assignee: LTV Aerospace Corporation, Dallas, Tex.
[22] Filed: Nov. 29, 1971
[21] Appl. No.: 202,921

[52] U.S. Cl............ 104/247, 180/79.2 R, 105/168, 105/176
[51] Int. Cl............................................ B61b 13/04
[58] Field of Search .. 280/81, 81.5; 180/79, 79.2 C, 180/79.2 R, 79.3; 104/118, 119, 242, 243, 244, 244.1, 245, 246, 247; 105/3, 4 R, 4 A, 165–170, 176, 215 C

[56] References Cited
UNITED STATES PATENTS

| | | | |
|---|---|---|---|
| 3,338,182 | 8/1967 | Maestrelli | 104/247 |
| 3,596,730 | 8/1971 | Cecce | 180/79.2 C |
| 3,589,302 | 6/1971 | Usami | 104/242 |
| 2,424,617 | 7/1947 | Hoyle | 180/79.3 |
| 2,468,158 | 4/1949 | Bartholomew | 104/247 |
| 3,363,584 | 1/1968 | Brush | 104/247 |

Primary Examiner—Gerald M. Forlenza
Assistant Examiner—D. W. Keen
Attorney, Agent, or Firm—Jack A. Kanz; H. C. Goldwire

[57] ABSTRACT

Disclosed is a system for steering a wheeled vehicle along a guideway. The system includes guide means parallel the desired course of the vehicle, front and rear guide followers adapted to follow the guide means, and apparatus for alternatively interconnecting either the front or rear guide follower with the steering mechanism on the vehicle. The front and rear steering linkages are interconnected so that steering of all wheels is provided by the guide follower on the leading end of the vehicle.

7 Claims, 3 Drawing Figures

PATENTED MAR 12 1974 3,796,165

GUIDE FOLLOWING STEERING APPARATUS

This invention relates to steering mechanisms for wheeled vehicles. More particularly it relates to track or guideways following apparatus for steering a four-wheeled vehicle.

Various types of on-track and off-track vehicles are currently used for rapid mass transportation. Frequently it is desirable that the same transportation vehicle be readily adaptable for use in a track following, remotely controlled configuration as well as a track-free, individually operable vehicle. Accordingly, the vehicle undercarriage must be adapted for off-track use and the steering mechanism for such vehicle must be adapted for either onboard steering or track-following steering. Similarly, the vehicle may be adapted to employ totally self-contained power means or may have drive means such as an electric drive motor adapted to be driven by an external power source.

Ordinarily vehicles adapted for both on-track and off-track use employ a conventional four wheeled vehicle design using pneumatic tires or the like adapted to operate on any substantially flat surface. Accordingly, when operated as a track-following vehicle, the track or guideway is a substantially flat surface with a guide means supported parallel the roadway surface for guiding the vehicle along a pre-determined course. Accordingly, the term "guideway" is used herein to describe a roadway surface with means associated therewith for steering a vehicle along a pre-determined course.

In guideway following vehicles it is preferable that both front and rear wheels be steerable to accommodate reasonably short turning radius of the vehicle, otherwise excessively wide guideways will be required to allow a long vehicle to turn. Furthermore, it is generally preferable that such vehicles be operationally symmetrical, i.e. operable in either direction. Consequently the steering mechanism must be adapted to permit proper steering in either direction of travel.

Conventionally, guide following steering mechanisms for symmetrical vehicles employ paired guide followers positioned fore and aft of each guided wheel. Accordingly, regardless of the direction of travel of the vehicle, the guide follower is immediately forward of the guided wheel. Unfortunately, such guide mechanisms are usually cumbersome, occupy large amounts of space, and otherwise interfere with the desired use of the vehicle, particularly where the guide means is elevated and parallel to the roadway traveled. Furthermore, because no slip angle can be assumed by the guided wheels during a turn, excessive lateral loads may be exerted on the guide followers.

In accordance with the present invention a guideway following steering mechanism for four wheeled vehicles is provided which utilizes guide followers positioned on opposite ends of the vehicle. The guide followers however, are selectively operable to alternatively steer all four wheels of the vehicle, the steering of front and rear wheels being fully interconnected. In operation, the forward guide follower is operatively interconnected with the steering apparatus on the vehicle and the trailing guide follower is not. Likewise, when the vehicle is operated in the reverse direction, the leading (rear) guide follower is used to steer the vehicle and the trailing (front) guide follower is disconnected. Accordingly, regardless of the direction of travel of the vehicle, the leading guide follower provides steering for all four wheels while allowing each set of wheels to assume its own proper slip angle without exerting unnecessary loads on the trailing guide follower. The interconnected steering mechanism may be conveniently linked to onboard steering of the vehicle for off-track use. Furthermore, the vehicle may be used on a guideway which steers all four wheels from a single guide follower, the guide follower always being forward the steered wheels, without employing guide sense reversing mechanisms or the like.

Figure 3:
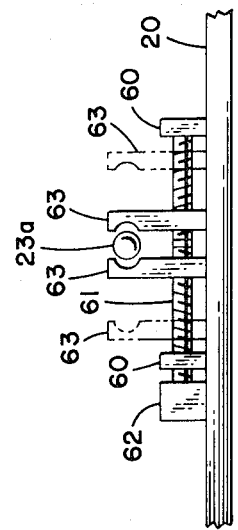
Figure 1:
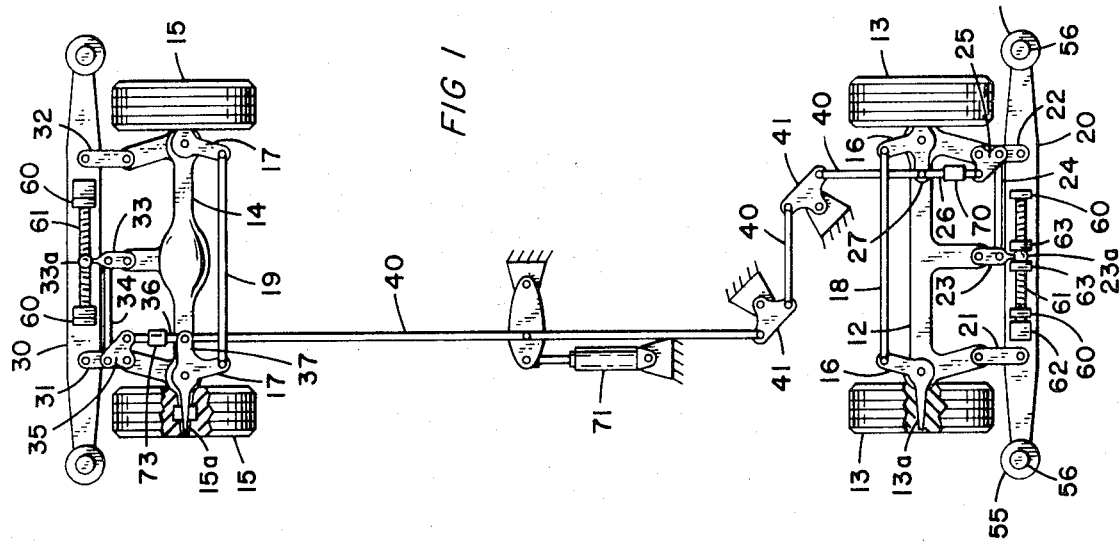

Other features and advantages of the invention will become more readily understood when taken in connection with the appended claims and attached drawings in which:

FIG. 1 is a schematic illustration of the guide following and steering mechanism of the invention, FIG. 2 is an elevational view, partially in section, of a guide following vehicle employing the apparatus of the invention on a guideway with upstanding guide means; and FIG. 3 is a perspective view of the preferred caging mechanism for interconnecting the guide follower and the vehicle steering linkage.

The preferred embodiment of the guide follower and steering apparatus of the invention is schematically illustrated in FIGS. 1 and 2. A suitable vehicle body 11 is supported on a pair of axle assemblies 12 and 14 by suitable suspension means such as springs, air bellows or the like. For clarity of illustration the vehicle frame and suspension mechanisms are not shown in the drawings. However, it will be understood that such components may be of suitable conventional design to accommodate the purposes for which the vehicle is intended.

Each axle assembly includes a pair of wheels 13 and 15, respectively. At least one axle assembly 14 is preferably adapted to drive the vehicle from an onboard power source (not shown) of conventional design. Axle assemblies 12 and 14 may be of conventional steerable wheel design employing a fixed axle with laterally extending spindles 13a, 15a hingedly attached to each end thereof by means of a vertical kingpin, thereby allowing the wheels to pivot with respect to the axle. The spindles are attached to inwardly diverging steering arms 16 and 17 and the steering arms 16 and 17 are interconnected by rods 18 and 19, respectively, of conventional design to provide Ackerman type steering of the wheels in each wheel assembly.

The wheel assemblies as described above may be any suitable conventional design, such as heavy duty truck wheel assemblies or the like, the operation and construction thereof being well known in the art.

A guide follower 20, comprising a horizontal structure or bar extending laterally of the vehicle, is pivotally attached for relative horizontal movement with respect to the vehicle immediately forward of the front axle assembly 12. The follower 20 is preferably supported by a pair of forwardly extending support arms 21 and 22 pivotally attached to the axle assembly 12 allowing the follower 20 to move laterally in either direction with respect to the axle. Control lever 23 is centrally located between the support arms 21 and 22 and is also pivotally attached to and projects forwardly from the axle assembly 12. Control lever 23 is operatively interconnected with the guide follower 20 so that movement of the guide follower 20 will cause control lever 23 to swing in the direction of travel of the guide follower.

A connecting rod 24 is attached to control lever 23 and bell crank 25. Bell crank 25 is also connected to steering arm 27, extending from one of the spindles 13a, by means of linkage arm 26. It will thus be observed that the guide follower 20 causes both wheels 13 to be turned in the same direction following the movement of the guide follower 20.

In similar fashion the rear wheel assembly includes guide follower 30 suspended from the rear axle by support arms 31 and 32. Guide follower 30 is operatively connected with tie rod 19 by means of control lever 33, connecting rod 34, bell crank 35, linkage rod 36 and steering arm 37.

Steering arms 27 and 37 on the front and rear axle assemblies, respectively, are operatively interconnected by a connecting linkage comprising a series of connecting rods 40 and bell cranks 41. It should be noted that the connecting rods 40 and bell cranks 41 interconnect steering arms 27 and 37 diagonally, that is, the right front wheel is connected to the left rear wheel or vice versa. Accordingly, when the front wheels are turned in one direction the rear wheels are turned in a like amount in the opposite direction.

The interrelation between the guide follower 20 and the guide means is illustrated in FIG. 2. Since the vehicle is adapted for either on-track or off-track use, the guideway is preferably a substantially flat surface 50. A guide means such as an inverted U-shaped channel 51 is supported by a vertical support means 52 parallel to the desired course of the vehicle.

In the preferred embodiment of the invention a guide wheel 55 is supported horizontally on spindle 56 at each end of the guide follower 20. Guide wheel 55 is adapted to ride within the inverted U-shaped channel guide member 51. It will thus be observed that when the guide wheel 55 is trapped between the walls of the guide channel 51 the guide follower 20 will follow the path of the guide channel 51.

Alternatively, the guideway may be a relatively flat road surface with parallel upstanding parapets on either side thereof defining a guideway channel within which the vehicle travels. The guide wheels 55 will then ride laterally against the inside of the parapet walls to guide the vehicle. Switching to alternate guideways may be accomplished through the use of inverted U-shaped channels suspended from the parapet walls as described above or by biasing the guide follower toward one of the parapet walls. When the guide follower is biased to one side, the vehicle will follow the parapet wall on the side to which the follower is biased. Simple springs, not shown, may be employed to selectively bias the steering apparatus.

Referring again to FIG. 1 it will be observed that since guide follower 20 is pivotally attached to the axle assembly and operatively interconnected with control lever 23, lateral movement of the guide follower 20 will result in proportionate steering of all four wheels of the vehicle. As noted above, it is desirable that the wheels be steered by a guide follower which leads the steered wheels. Accordingly, if the vehicle is designed to travel in only one direction, a single guide follower is required. However, it is often desirable that the vehicle be adapted for travel in either direction following the same guideway. Accordingly, the vehicle is equipped with fore and aft guide followers 20 and 30, each provided with means for selectively independently controlling the steering apparatus of the vehicle. In accordance with the preferred embodiment of the invention, as illustrated in FIG. 3, each guide follower 20 and 30 carries a centrally disposed shaft 61 parallel thereto and rotatably journaled in a pair of bosses 60. Shaft 61 is adapted to be rotated by suitable drive means such as a reversable electric motor 62 or the like. Each half of the shaft 61 between the bosses 60 is oppositely threaded and passes through a similarly threaded vise-like member 63. It will thus be observed that upon rotation of the shaft 61 in a first direction by drive means 62 the vise-like members 63 will converge and engage the control lever 23, holding the end of the control lever 23 therebetween. Upon rotation of the shaft 61 in the opposite direction, vise-like members 63 will be withdrawn (as shown in phantom) disconnecting the control lever 23 from the guide follower 20.

Control lever 23 preferably terminates in a ball 23a and the abutting surfaces of vise-like members 63 are suitably dish-shaped to mate with and securely cage the ball end therebetween, thus allowing the control arm 23 to pivot in response to horizontal movement of the guide follower 20.

The aft follower 30 is provided with a similar control lever caging mechanism. Accordingly, the forward or aft control levers may be independently selectively operatively engaged with the control lever 23 or 33 and either guide follower 20 or 30 utilized to provide steering for all four vehicle wheels. Thus if the vehicle is to follow a guideway in the reverse direction, control lever 33 is caged by the vise-like members 63 and control lever 23 is uncaged, allowing guide follower 20 to follow the track but have no effect on the steering. Likewise, control lever 23 is free to move within the space between the vise-like members 63 in response to steering provided by the rear guide follower 30. Alternatively, when front control lever 23 is engaged by vise-like members 63 on front guide follower 20, rear control lever 33 is uncaged to allow all four wheels to be steered in response to the front guide follower 20.

As described hereinabove the entire steering mechanism is provided by mechanical linkages. However, it will be readily recognized that the steering apparatus may be adapted for power assisted steering by including a suitable power steering valve 70 in the connecting linkage between steering arm 27 and the guide follower 20. The power steering valve 70 is appropriately interconnected to operate a power steering cylinder 71 conveniently located to operatively engage the interconnecting linkage 40 and thereby apply power assisted steering in response to movement of the guide follower 20. Likewise, a suitable power steering valve 73 may be provided between the rear guide follower 30 and steering arm 37. Rear valve 73 operates the same power steering cylinder 71. Therefore, power assisted steering is provided through the same system if either the front or rear guide follower is used to steer the vehicle.

To provide off-track steering of the vehicle, conventional on-board manual steering may be operatively interconnected with the steering mechanism described above. When operated off the guideway, all steering will be provided by the manual steering mechanism. When operated on the guideway, the manual steering may be disengaged if desired.

As shown in FIGS. 1 and 2, guide followers 20 and 30 are elongated bars pivotally mounted horizontally fore and aft of the vehicle. Since the guide followers 20, 30 extend laterally from both sides of the vehicle, steering may be provided by guide wheels 55 engaging a guide channel 51 on either or both sides of the vehicle. Furthermore, guide channel 51 may be eliminated if upstanding guide walls, such as guide wall 52, are provided on both sides of the guideway. In such cases the guide wheels 55 on opposite ends of the guide followers 20 and 30 would be confined between the parallel guide walls and operate to guide the vehicle between the walls.

Where the vehicle is powered by an on-board electrical motor, electrical power may be supplied thereto by electrical cables 58 conveniently located in one or both of the guide walls. Electrical cables 58 are contacted by brush contacts 59 depending or projecting from the vehicle body or the guide follower 20. Brushes 59 may depend from either or both sides of the vehicle, depending on the guide wall construction and design.

While the invention has been described with particular reference to electrically powered vehicles, it will be readily understood that the invention is not so limited. The steering and guideway apparatus described, however, may be employed in connection with various self-propelled or un-powered vehicles operated independently or coupled together. It is to be understood, therefore, that although the invention has been described with particular reference to specific embodiments thereof, the form of the invention shown and described in detail is to be taken as the preferred embodiment of same, and that various changes and modifications may be resorted to without departing from the spirit and scope of the invention as defined by the appended claims.

What is claimed is:

1. Steering apparatus for a vehicle adapted to travel on a guideway having at least one upstanding guide means parallel to the desired course of the vehicle, said vehicle having front and rear wheel assemblies, said front and rear wheel assemblies each having a pair of steerable wheels interconnected by control means, comprising:
   a. front and rear follower means adapted to follow said guide means, the front follower means comprising substantially horizontal wheels mounted immediately in front of the front wheel assemblies, and rear follower means comprising substantially horizontal guide wheels mounted immediately to the rear of the rear wheel assemblies, both the front and rear guide wheels having engagement with the guide means when the vehicle is aligned with the guideway and during movement of the vehicle in either direction along the guideway.
   b. means for selectively operatively interconnecting the front control means with the front follower means and disconnecting the rear control means from the rear followers means and, alternatively, interconnecting the rear control means with the rear follower means, and disconnecting front control means from front follower means whereby movement of the follower means interconnected with a control means is translated into proportionate movement of the control means connected thereto, and
   c. means interconnecting the front control means and the rear control means, whereby steering one pair of wheels in one direction steers the other pair of wheels in the opposite direction.

2. Apparatus as defined in claim 1 wherein said front and rear follower means are elongated horizontal structures pivotally mounted for relative horizontal movement with respect to said vehicle, the front follower means mounted immediately in front of the front axle assembly and the rear follower means mounted immediately behind the rear axle assembly.

3. Apparatus as defined in claim 2 wherein said control means includes a control lever operable to steer said wheels and having one end adapted for selective engagement with said follower means.

4. Apparatus as defined in claim 3 wherein said follower means includes caging means for selectively caging said one end of said control lever and pivotally interconnecting said control lever and said follower means.

5. Apparatus as defined in claim 4 wherein said caging means comprises:
   a. a pair of vise-like members slideably mounted for axial movement along the central portion of said follower means,
   b. a rotatable shaft mounted coaxially with said follower means and threadedly engaging said vise-like members, said shaft being oppositely threaded on opposite sides of the central portion thereof, whereby rotation of said shaft in one direction causes said vise-like members to converge near the central portion of said shaft and rotation of said shaft in the opposite direction causes said vise-like members to move in opposite directions away from the central portion of said shaft, and
   c. reversable drive means for rotating said shaft.

6. Apparatus as defined in claim 5 wherein the opposed faces of said vise-like members are shaped to pivotally cage said one end of said control lever therebetween.

7. Apparatus as defined in claim 1 wherein each follower means comprises;
   a. a pivotally mounted horizontal bar mounted normal to the direction of travel of said vehicle and extending laterally from each side of said vehicle,
   b. guide wheels mounted in each end of said horizontal bar and adapted follow said guide means.

* * * * *